United States Patent
Agar

(10) Patent No.: US 7,342,593 B2
(45) Date of Patent: Mar. 11, 2008

(54) COLOR MAPPING METHODS, DATA SIGNALS, ARTICLES OF MANUFACTURE, AND COLOR MAPPING APPARATUSES

(75) Inventor: Ufuk A. Agar, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 747 days.

(21) Appl. No.: 10/286,657

(22) Filed: Nov. 1, 2002

(65) Prior Publication Data

US 2004/0085326 A1    May 6, 2004

(51) Int. Cl.
*G09G 5/02* (2006.01)
(52) U.S. Cl. .................. 345/604; 345/589; 345/591
(58) Field of Classification Search ............ 345/589, 345/591, 604; 358/523
See application file for complete search history.

(56) References Cited

U.S. PATENT DOCUMENTS

| | | | | |
|---|---|---|---|---|
| 5,471,324 | A * | 11/1995 | Rolleston | 358/518 |
| 5,506,696 | A * | 4/1996 | Nakano | 358/504 |
| 5,978,011 | A | 11/1999 | Jacob et al. | |
| 6,062,137 | A | 5/2000 | Guo et al. | |
| 6,172,692 | B1 * | 1/2001 | Huang et al. | 347/43 |
| 6,278,533 | B1 * | 8/2001 | Takemoto | 358/521 |
| 6,340,975 | B2 | 1/2002 | Marsden et al. | |
| 6,456,395 | B1 | 9/2002 | Ringness | |
| 6,564,150 | B2 * | 5/2003 | Gilmer et al. | 702/14 |
| 6,698,860 | B2 * | 3/2004 | Berns et al. | 358/1.9 |

OTHER PUBLICATIONS

"Model Based Color Separation for CMYKcm Printing"; A. Ufuk Agar; Nov. 2001; 5 pps.
"An Iterative Cellular YNSN Method for Color Printer Characterization"; Agar et al.; Nov. 1998; 4 pps.
"Color Spaces"; http://devworld.apple.com/techpubs/mac/ACI/ACI-48.html; Oct. 17, 2002; pp. 1-8.
"Practical Color Management"; Nitin Sampat; hhttp://www.rit.edu/nxspph/courses/fci/lectures/lec8_color.ppt; Oct. 7, 2002; 28 pps.
"ColorFAQ"; http://www.inforamp.net/poynton/ColorFAQ.html; Oct. 17, 2002; 2 pps.
"How can tristimulus values be calculated"; http://www.colourware.co.uk/cpfaq/q3-8.html; Oct. 17, 2002; 1 pp.
"Colour Space Conversions"; Ford et al.; Aug. 11, 1998; pp. 1-31.
"Model Based Colorant Selection for Textile of Hi-fi Printing"; A. Ufuk Agar; Nov. 3, 2000; pp. 1-16.
http://www.student.math.uwaterloo.ca/ cs781/I12p.pdf.; Oct. 7, 2002; 26 pps.

* cited by examiner

Primary Examiner—Kee M. Tung
Assistant Examiner—Hau H Nguyen

(57) ABSTRACT

Color mapping methods, data signals, articles of manufacture, and color mapping apparatuses are described. According to one aspect, a color mapping method includes providing a spectral model corresponding to a respective image forming device configured to utilize a plurality of available colorants of a device dependent color space to form a plurality of hard images, providing a colorimetric value of a device independent color space, and searching a plurality of weighting values for individual ones of the available colorants to associate the colorimetric value with a plurality of weights of the available colorants.

37 Claims, 4 Drawing Sheets

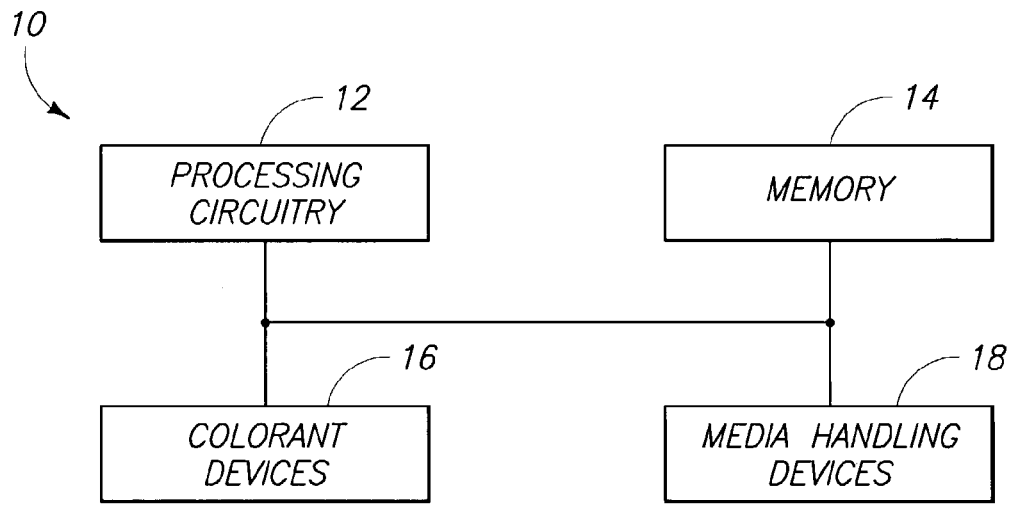
$F_{I}$ $\boxed{J}$ $\mathit{I}$
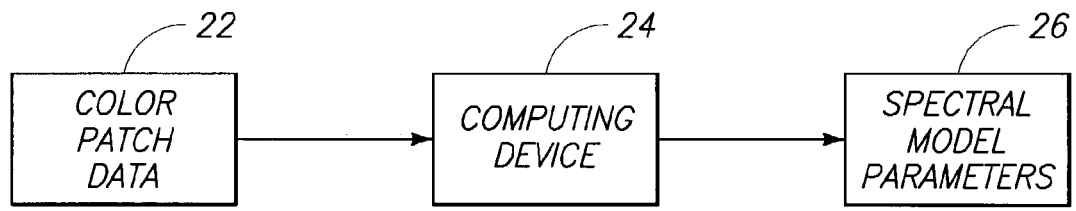
$F_{I}$ $\boxed{J}$ $\mathit{2}$

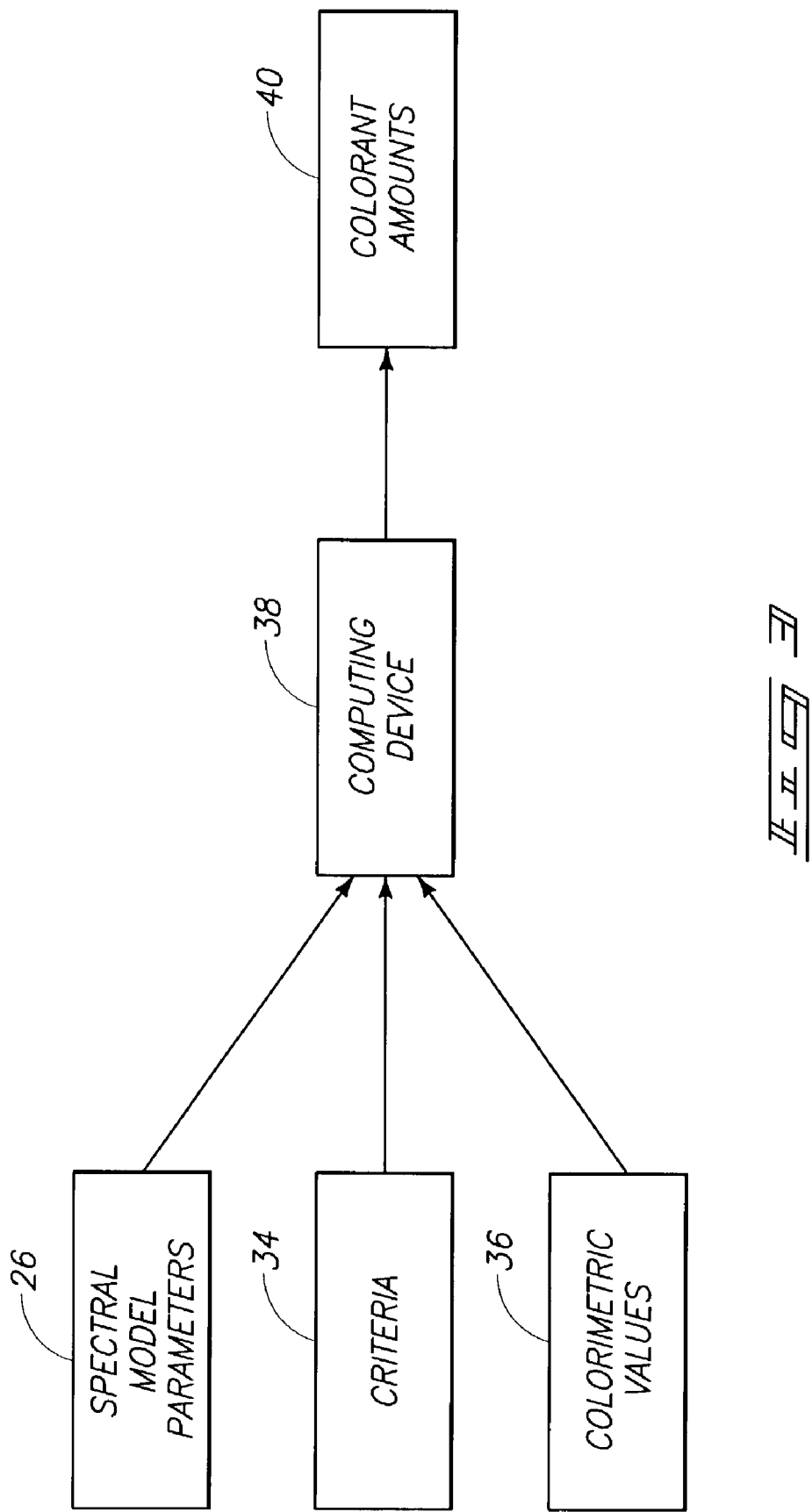

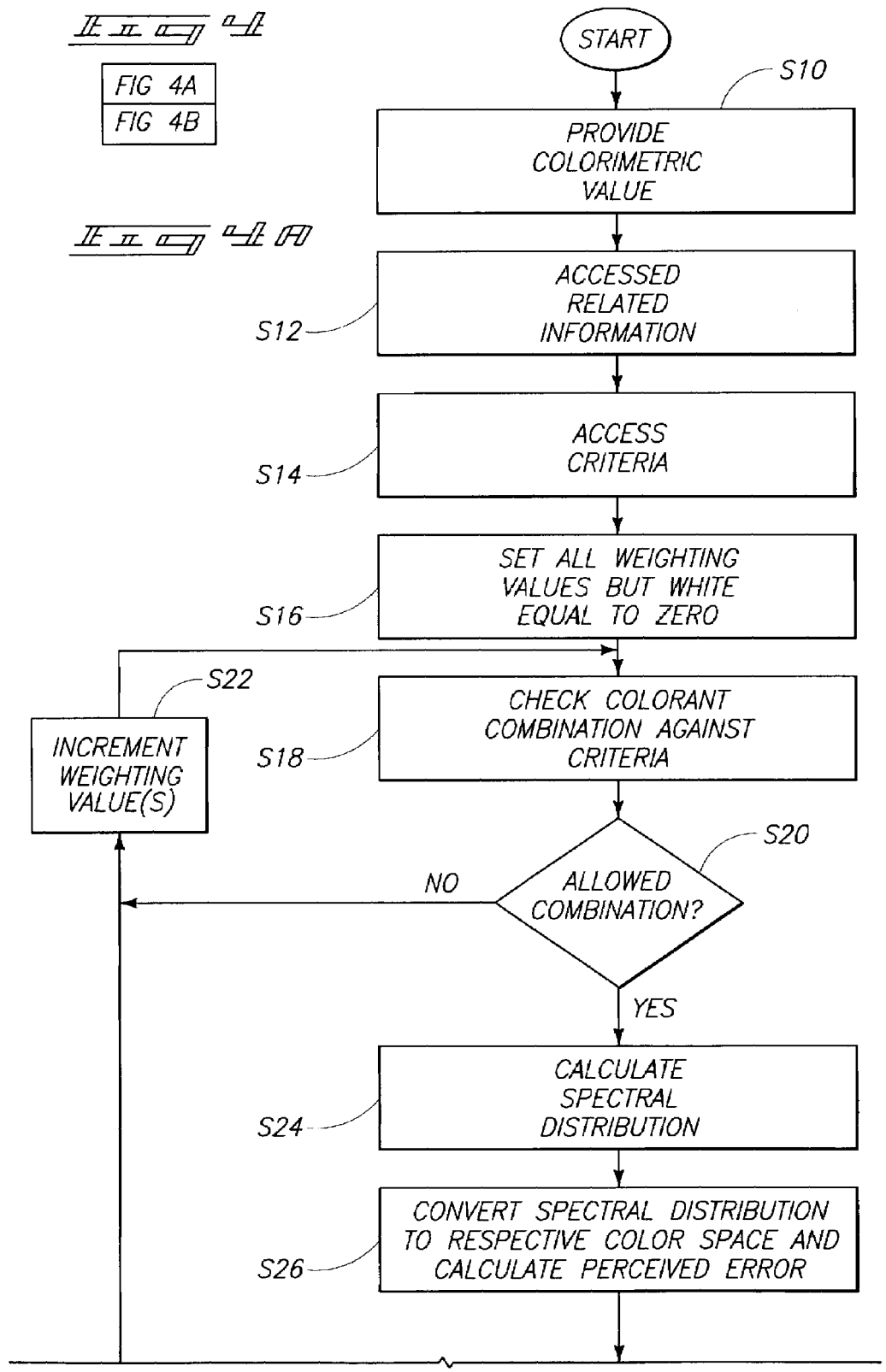

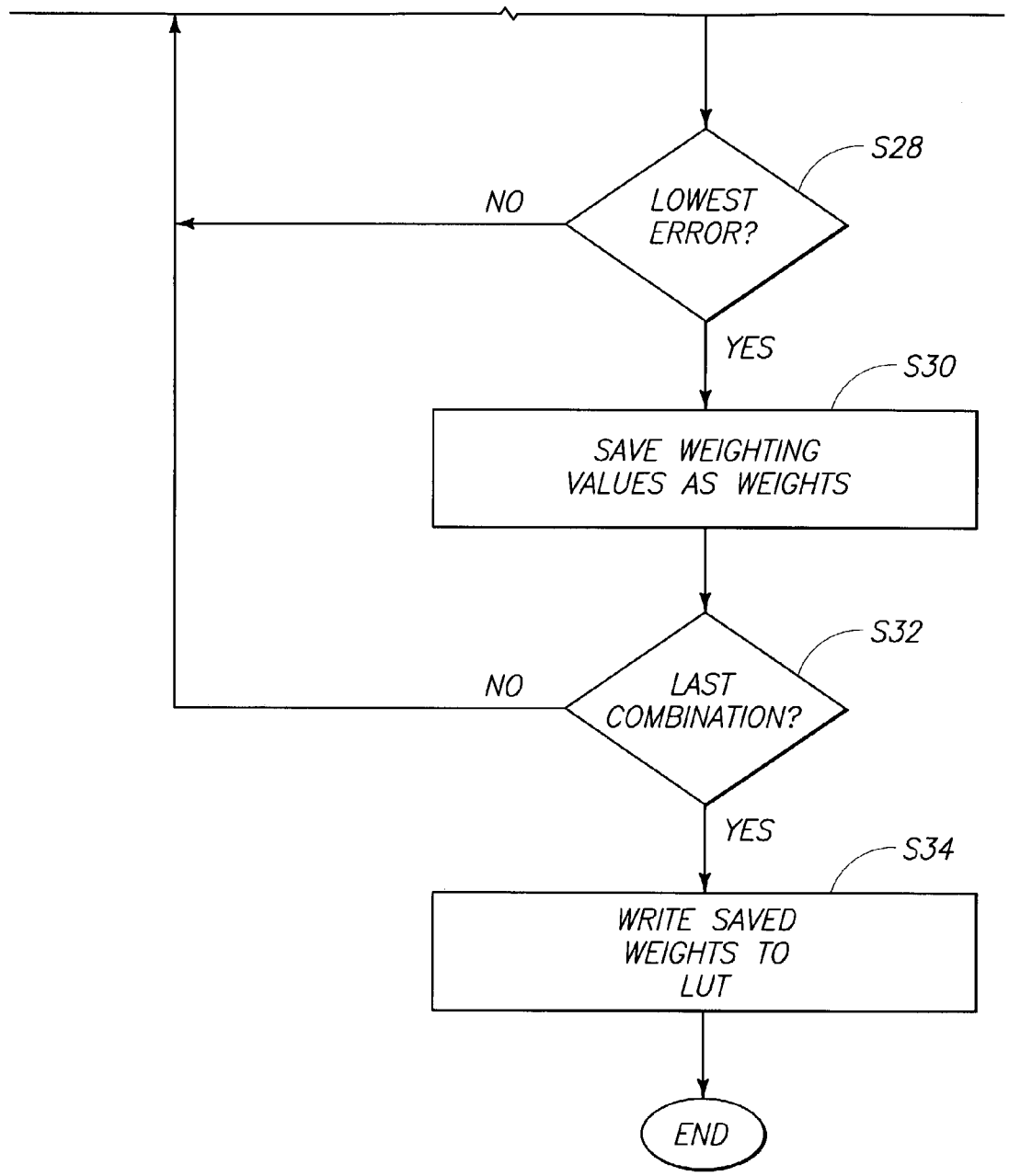

COLOR MAPPING METHODS, DATA SIGNALS, ARTICLES OF MANUFACTURE, AND COLOR MAPPING APPARATUSES

FIELD OF THE INVENTION

At least some aspects of the invention relate to color mapping methods, data signals, articles of manufacture, and color mapping apparatuses.

BACKGROUND OF THE INVENTION

Computer systems including personal computers, workstations, hand held devices, etc. have been utilized in an increasing number of applications at home, the workplace, educational environments, entertainment environments, etc. Peripheral devices of increased capabilities and performance have been developed and continually improved to extend the functionality and applications of computer systems. For example, imaging devices, such as printers, have experienced significant advancements including refined imaging, faster processing, and color reproduction. There have been desires to provide color printers which can accurately produce a satisfactory printout of what is displayed on the screen of a color monitor.

Numerous challenges are presented to coordinate color appearances produced with two different physical systems (e.g., a monitor and a printer) to provide accurate and pleasing color reproductions and to balance accuracy and the pleasing-nature between different applications. Part of this problem arises from the subjective nature of color. Color is a sensation produced by the combined effects of light, objects and human vision. A particular color or combination of colors may be appealing to one person while at the same time be offensive to another.

Another part of the "satisfactory"-color definitional problem arises from the different color technologies used in computer displays (e.g., monitors), color printers, and other color-presenting devices. In general, these technologies diverge dramatically. For example, color presentation by cathode ray tube (CRT) computer monitors and television sets may be based on a color gamut defined by red, green and blue (RGB) CRT intensities. Color presentation by printers, such as inkjet printers, may be instead typically based on a color gamut defined by cyan, magenta, yellow and black (CMYK) printed-page colorants. The RGB color intensities of CRT screens are combined together in an additive way by mixing red, green and blue light rays from a first class of physical substances (e.g., phosphors) to form a first variety of different colors. The CMYK components of color inks, a second and entirely different class of physical substances, are applied to media in different combinations in a subtractive way to form a second variety of different colors, and the three chromatic elements CMY are only nominally the complements of the RGB intensities.

More recently, high-fidelity imaging devices (e.g., digital color presses or printers using more than four colorants) have been introduced to provide improved color reproduction. For example, light cyan and light magenta colorants may also be utilized in addition to the conventional cyan, magenta, yellow, and black colorants to provide improved color reproduction with smoother color gradients. Additional examples include Hexachrome™ devices which also utilize orange and green and Indichrome™ devices which also utilize orange and violet in addition to CMYK colorants to enlarge the gamut of the device. Various design issues are presented by the utilization of devices with more than four colorants. More specifically, issues concerning the association of data from a received color space to the native color space of a device are presented.

SUMMARY OF THE INVENTION

Aspects of the invention relate to color mapping methods, data signals, articles of manufacture, and color mapping apparatuses.

According to one aspect, a color mapping method comprises providing a first spectral model including a plurality of variables, providing a second spectral model corresponding to a respective image forming device configured to utilize a plurality of available colorants to form a plurality of hard images, wherein the providing the second spectral model includes identifying a plurality of values for at least some respective ones of the variables of the first spectral model, providing a plurality of colorimetric values of a device independent color space, and associating individual ones of the colorimetric values with a plurality of weights of respective ones of the available colorants using the second spectral model including the identified values.

According to another aspect of the invention, a color mapping method comprises providing a spectral model corresponding to a respective image forming device configured to utilize a plurality of available colorants of a device dependent color space to form a plurality of hard images, providing a colorimetric value of a device independent color space, and searching a plurality of weighting values for individual ones of the available colorants to associate the colorimetric value with a plurality of weights of the available colorants.

According to an additional aspect of the invention, a data signal embodied in a transmission medium comprises processor-usable code configured to cause processing circuitry to access a spectral model corresponding to a respective image forming device configured to utilize a plurality of available colorants of a device dependent color space to form a plurality of hard images, processor-usable code configured to cause processing circuitry to access a colorimetric value of a device independent color space, and processor-usable code configured to cause processing circuitry to search a plurality of weighting values for individual ones of the available colorants using the spectral model to associate the colorimetric value with a plurality of weights of the available colorants.

According to yet another aspect of the invention, an article of manufacture comprises a processor-usable medium comprising processor-useable code embodied therein and configured to cause processing circuitry to access a spectral model corresponding to a respective image forming device configured to utilize a plurality of available colorants of a device dependent color space to form a plurality of hard images, access a colorimetric value of a device independent color space, and search a plurality of weighting values for individual ones of the available colorants using the spectral model to associate the colorimetric value with a plurality of weights of the available colorants.

According to an additional aspect of the invention, a color mapping apparatus comprises first means for accessing a first spectral model including a plurality of variables and for providing a second spectral model corresponding to a respective image forming device configured to utilize a plurality of available colorants to form a plurality of hard images, wherein the first means is configured to identify a plurality of values for at least some respective ones of the variables of the first spectral model to provide the second spectral model, and second means for associating individual ones of a plurality of colorimetric values of a device independent color space with a plurality of weights of respective ones of the available colorants using the second spectral model including the identified values.

According to yet another additional aspect of the invention, a color mapping apparatus comprises processing circuitry configured to access a spectral model corresponding to a respective image forming device configured to utilize a plurality of available colorants of a device dependent color space to form a plurality of hard images, to access a colorimetric value of a device independent color space, and to search a plurality of weighting values for individual ones of the available colorants using the spectral model to associate the colorimetric value with a plurality of weights of the available colorants.

Other aspects of the invention are disclosed herein as is apparent from the following description and figures.

DESCRIPTION OF THE DRAWINGS

FIG. 1 is a functional block diagram of an exemplary image forming device.

FIG. 2 is an illustrative representation of an exemplary process for obtaining spectral model parameters for an image forming device.

FIG. 3 is an illustrative representation of an exemplary process for obtaining weights for use in an image forming device to control the reproduction of colors corresponding to received colorimetric values.

FIG. 4 is a map showing how FIGS. 4A and 4B are to be assembled. Once assembled, FIGS. 4A and 4B depict a flow chart of an exemplary methodology for identifying the weights.

DETAILED DESCRIPTION OF THE INVENTION

As described herein, some aspects of the invention enable color mapping from a first color space to a second color space wherein the second color space includes more color space dimensions than the first color space using calculations and without imaging any of the available colorants during the color mapping process. Additional aspects of the invention use a spectral model based characterization of a color image forming device to perform color separation operations including computing amounts of available colorants to produce a desired color. Constraints or other criteria may be utilized inasmuch as a colorimetric description of colors having three degrees of freedom and the color separation problem for image forming devices having four or more colorants is a mathematically under-constrained optimization problem.

Accordingly, aspects of the invention enable color separation for color image forming devices without empirical testing of colorants by printing and measuring test patches. Providing initial color separation as described herein according to exemplary aspects may reduce a number of iterations performed to obtain a visually pleasing color separation resulting in relatively fast solutions and significantly reduced time. Further, an initial color separation may be fine tuned or adjusted with considerably lower iterations than otherwise possible for color separation. Further aspects of the invention enable the study of effects of different color separation choices and constraints on colorant amounts and preferences on the resulting spectral distributions without empirical testing. Exemplary methods of the invention are advantageous for devices where the number of possible colors separation choices and constraints are too large to test empirically (e.g., high-fidelity color printers or other devices having more than four colorants) although other aspects of the invention are not limited to such devices.

Referring to FIG. 1, an exemplary image forming device 10 is arranged to generate hard images upon media such as paper, labels, transparencies, roll media, etc. Hard images include images physically rendered upon physical media. Exemplary image forming devices 10 include digital color presses, color printers, color facsimile devices, color copiers, color multiple-function printers (MFPs) or other devices capable of forming hard images upon media. Utilization of some aspects of the invention may be advantageous in configurations of image forming device 10 which have an increased number of native color space dimensions (i.e., degrees of freedom in the device-dependent color space) compared with a number of dimensions (i.e., degrees of freedom) of a color space of received image data to be imaged. For example, high-fidelity printers, presses, or other devices may include four or more colorants (e.g., CMYKcm) within their native color spaces for producing color images wherein image data (e.g., colorimetric values) presented to the device to be imaged may have less degrees of freedom (e.g., CIE (Commission Internationale L'Eclairage) L*a*b* device independent color space values have three degrees of freedom).

The exemplary configuration of image forming device 10 includes processing circuitry 12, a memory 14, a plurality of colorant devices 16, and one or more media handling devices 18. Some of the depicted components of image forming device 10 are optional and other arrangements of device 10 configured to form hard images are possible. In addition, additional components may be provided within image forming device 10, such as a user interface, a communications interface arranged to receive image data from a host network, or other source, etc.

Processing circuitry 12 may be implemented as a microprocessor arranged to execute executable code or programs to control operations of image forming device 10, process received imaged jobs, implement color mapping operations between respective color spaces, etc. Processing circuitry 12 may execute executable instructions stored within articles of manufacture, such as memory 14, mass storage devices (e.g., hard disk drives, floppy disks, optical disks, etc.) or within another appropriate device, and embodied as, for example, software and/or firmware instructions. Processing circuitry 12 may provide appropriate control signals to colorant devices 16 to control the generation of hard images.

Memory 14 stores digital data and instructions. For example, memory 14 is configured to store image data, executable code, and any other appropriate digital data to be stored within image forming device 10. Memory 14 may be implemented as random access memory (RAM), read only memory (ROM) and/or flash memory in one example. Memory 14 may include a look up table (LUT) which may be accessed to implement color mapping operations described herein.

Colorant devices 16 are arranged to provide colorants or marking agents, such as inkjet inks, Laserjet™ toners, and liquid toners, upon media responsive to control signals from processing circuitry 12 or other circuitry. In one configuration, colorant devices 16 are arranged to utilize a dot-on-dot printing geometry to form hard images. Other configurations or geometries are possible. In one example, image forming device 10 is arranged to utilize a color space having more than four colorants to generate hard images. In an example wherein CMYKcm color space is used, colorant devices 16 may include six dedicated devices arranged to dispense respective colorants including cyan, magenta, yellow, black, light cyan, and light magenta. As described below, weights are provided to colorant devices 16 from processing circuitry 12 or other source to control amounts of colorants printed or otherwise dispensed at a given pixel location.

Media handling devices 18 provide movement of media to be imaged within image forming device 10. Media handling devices 18 may include actuated rollers or other configurations for moving media from an input tray (not shown) or other source to colorant devices 16 for imaging and to an output and finishing tray or other destination.

Image data to be imaged by device 10 may be provided in a color space other than a native color space of device 10. For example, image data may be provided in a device independent color space, such as CIE L*a*b*, while image forming device 10 may utilize a different native color space, such as CMYKcm, to render hard images. A color map may be generated and utilized by image forming device 10 to provide appropriate weights to respective colorant devices 16 to control the amount of colorants provided at a given pixel location responsive to received image data. In one embodiment, a color map may be implemented as a look up table (LUT) stored within memory 14 although other implementations are possible.

Referring to FIG. 2, some exemplary operations are illustrated for training a first spectral model to obtain a second spectral model for the respective image forming device. The second spectral model may be subsequently utilized to generate a color map for utilization within image forming device 10 to provide mapping of data to an appropriate native or device-dependent color space. In one possible implementation, the first model to be trained for device 10 is a Yule-Nielsen modified spectral Neugebauer model depicted as eqn. 1:

$$R^{1/n}(\lambda) = \sum_{i=1}^{N} w_i R_i^{1/n}(\lambda)$$

wherein the variables may be defined as:
n=a Yule-Nielsen parameter determined from training operations;
$R(\lambda)$=spectral distributions of color patches from primary and secondary ramps;
$R_i(\lambda)$=spectral distributions of Neugebauer primaries;
N=number of Neugebauer primaries; and
$w_i$=weights of the i-th Neugebauer primary in a measured patch from a ramp.

Color patch data 22 may be utilized to train a spectral model. In one embodiment, a plurality of color patches are imaged using the image forming device 10 to provide the color patch data 22. The imaged color patches may include primaries (i.e., only one colorant of the device 10 at a time), and secondaries (i.e., two colorants of device 10 at a time). The primaries for a Neugebauer model may include all possible full combinations of the colorants and for an exemplary six colorant printer, the primaries include paper white, single colorants, two colorants out of six at a time, three out of six at a time, four out of six at a time, five out of six at a time, and all six together providing sixty four distinct colors.

The number of patches imaged for the primaries and the secondaries may be varied although increased accuracy at the model training stage is obtained through the utilization of an increased number of patches. In one example, twenty one patches of individual ones of the primary ramps and the secondary ramps are printed starting at 0% fill (i.e., paper white) increasing in increments of 5% to 100% fill. For a configuration of device 10 including six colorants, there are six primary ramps of patches and fifteen secondary ramps of patches imaged providing twenty one ramps in the described example. Other numbers of patches and ramps may be utilized.

The utilization of patches is advantageous inasmuch as the patches are imaged in the native color space of device 10 and the amount(s) of colorant(s) imaged for a given patch is known. Following the imaging of the patches, the spectral distribution of the patches may be obtained. In one example, the spectral distributions may be provided using a spectrophotometer arranged to sample the patches at 10 nm increments from 380 nm to 730 nm providing a thirty six length vector of numbers (comprising the spectral distribution) for individual color patches. Color patch data 22 includes the vectors for individual color patches in the illustrated embodiment as well as the amounts of colorants utilized to produce the color patches. The described example is for illustrative purposes only and other ranges, incremental sampling intervals or other procedures may be utilized to provide spectral distributions.

Color patch data 22 is applied to a computing device 24, such as a workstation, personal computer, or other appropriate device which may include processing circuitry, arranged to process the received data 22 and to provide spectral model parameters 26 which may be utilized in an exemplary manner described further below with respect to FIG. 3 to provide a color map. Computing device 24 is arranged to solve for n of eqn. 1 using the color patch data 22 to provide spectral model parameters 26 for the device 10 which provided the color patch data 22 (i.e., training of the spectral model corresponding to device 10).

Computing device 24 is arranged to determine the weights corresponding to colorant amounts which produced the patches for analysis in determining parameters 26. In other arrangements, the weights may comprise a part of the color patch data 22 provided to computing device 24. In an exemplary dot-on-dot geometry (other imaging geometries may be utilized), the colorants are provided on top of one another and weights should sum to one. Further, weights of colorants provided on top of one another may be multiplied by one another. For example, for a patch that has 5% cyan and 5% magenta, $W_{blue}$ is 0.05×0.05=0.0025, and final $W_{cyan}$ and $W_{magenta}$ may be determined by subtracting the blue portion to provide the fraction of the patch covered with cyan or magenta (e.g., 0.05−0.0025=0.0475=$W_{cyan}$ or $W_{magenta}$ and $W_{white}$=1−0.095−0.0025=0.9025).

The weights and spectral distribution data are utilized by computing device 24 to train the spectral model of device 10. In the described example, computing device 24 solves for n of the spectral model using the weights and spectral distribution data. In one embodiment, computing device 24 iterates over all reasonable candidates for n and uses the one which minimizes a root mean square error value in a device independent and perceptually uniform color space (e.g., CIE L*a*b* space inasmuch as the Euclidean distance in CIE L*a*b* space is ΔE (ΔE is a measure (correlate) of perceived differences by humans).

In one exemplary configuration, the exemplary process above is implemented by computing device 24 using the following procedure:

---

For each possible n:
  Sum_square_error = 0
    For each test patch:
    Use the eqn 1. to the get the approximated R(λ) LHS;
    Convert R(λ) LHS to CIE XYZ and then to CIE L*a*b*;
    Convert R(λ) RHS to CIE XYZ and then to CIE L*a*b*;
    Take the difference of the 2 CIE L*a*b* values and calculate a correlate of perceived error, for example:
$$\Delta E = \sqrt{(L^*_{given} - L^*_{approx.})^2 + (a^*_{given} - a^*_{approx.})^2 + (b^*_{given} - b^*_{approx.})^2}$$
Add square of ΔE to Sum_square_error
    End
  Find root mean squared error

---

Computing device 24 determines the n value which provides the smallest root mean squared error using the above-described or other method. In the exemplary arrangement, computing device 24 may implement the R(λ) to CIE L*a*b* conversions by obtaining CIE XYZ tristimulus values. For example, CIE XYZ tristimulus values can be calculated by the integration of the reflectance values R(λ), the relative spectral energy distributions of the illuminant E(λ), and the standard observer functions x(λ), y(λ), and z(λ). The integration is approximated by summation, thus:

$$X = 1/k \sum_j R(\lambda_j) E(\lambda_j) x(\lambda_j)$$

$$Y = 1/k \sum_j R(\lambda_j) E(\lambda_j) y(\lambda_j)$$

$$Z = 1/k \sum_j R(\lambda_j) E(\lambda_j) z(\lambda_j)$$

$$\text{where } k = \sum_j E(\lambda_j) y(\lambda_j)$$

and $\lambda_j$=wavelength of $j^{th}$ sample in the vectors showing the relative spectral distribution of luminance E or the standard observer function X or Y or Z or the reflectance spectra R.

The normalizing factor 1/k is introduced such that Y=1 for a sample that reflects 100% at all wavelengths and Y is proportional to the luminance of the stimulus. The introduction of this normalization is convenient since it means that relative, rather than absolute, spectral energy distributions for the illuminant can be used (thus the units in which they are expressed are unimportant).

The CIE L*a*b* values are obtained assuming a reference stimulus with colorimetric values XnYnZn and the following exemplary equations:

$$L^* = \begin{cases} 116(Y/Yn)^{1/3} - 16 & \text{if } (Y/Yn) > 0.008856 \\ 903.3(Y/Yn) & \text{if } (Y/Yn) \leq 0.008856 \end{cases}$$

$$a^* = 500 * (f(X/X_n) - f(Y/Y_n))$$

$$b^* = 200 * (f(Y/Y_n) - f(Z/Z_n))$$

$$\text{where } f(t) = \begin{cases} t^{1/3} & \text{if } t > 0.008856 \\ 7.787 * t + 16/116 & \text{if } t \leq 0.008856 \end{cases}$$

The determination of the n value completes the training aspects of the first spectral model and yields the spectral model parameters 26 providing the second spectral model (also referred to as a spectral characterization) of image forming device 10. Exemplary spectral model parameters 26 for the exemplary model described herein include spectral distributions of the Neugebauer primaries $R_i(\lambda)$, n, and N which comprise exemplary values for variables of the first spectral model which provide the second spectral model.

Referring to FIG. 3, the spectral model parameters 26 of the second spectral model may be utilized to derive a color map which may be implemented within device 10 to control colorant devices 16. Spectral model parameters 26 are provided to computing device 38 for processing. Computing device 38 may be implemented using device 24, or arranged as another device, such as another workstation, personal computer, or other appropriate device which may include processing circuitry, and configured to process received data and to provide colorant amounts 40 (e.g., weights for available colorants). Device 24 and/or device 38 may be referred to as a color mapping apparatus. In addition to spectral model parameters 26, criteria 34 and colorimetric values 36 may additionally be provided to computing device 38. Criteria 34 is utilized to assist device 38 with searching for colorant amounts 40. Colorimetric values 36 may correspond to possible values which may be provided to device 10 for imaging. In one aspect, colorimetric values 36 are provided in an independent color space (e.g., CIE L*a*b*). Computing device 38 processes received data to associate colorimetric values 36 with respective weights of available colorants.

According to an exemplary operational aspect, computing device 38 searches for weights to control respective colorant devices 16 to provide the closest reproduction of received image data (e.g., provided within CIE L*a*b* space). Computing device 38 performs the search without imaging or printing of additional patches by utilizing the spectral model previously trained for image forming device 10 in the exemplary described embodiment.

Computing device 38 searches using a plurality of weighting values (also referred to as colorant weighting values) for respective ones of the $w_i$ variables (corresponding to the available colorants) of the spectral model to determine the best combination of weights for the colorants which provides a desired perceived error with respect to colorimetric values 36 being analyzed.

An exemplary method for searching weighting values for colorant devices 16 includes searching the weighting values of specific ones of the available colorants before searching others of the available colorants according to criteria 34. Criteria 34 may provide rules regarding the utilization of available colorants to form hard images resulting from empirical knowledge or other experience. Constraints of criteria 34 may be implemented within the searching protocol according to a preferred usage of available colorants. For example, in one possible embodiment, it is desired to maximize usage of one available colorant before using or incrementing another of the available colorants. In the exemplary CMYKcm color space example, it may be desired to use maximum amounts of the lightest colorants before incrementing usage of darker colorants.

An exemplary methodology for searching the possible weighting values to determine the appropriate weights for usage in a color map may be implemented using a plurality of nested loops to control incrementing of respective weight ing values according to constraints. One possible arrangement of the loops includes:

```
For black: min-max;
    For magenta: min-max;
        For cyan: min-max;
            For light_magenta: min-max;
                For light_cyan: min-max;
                    For yellow: min-max.
```

As shown from the exemplary nested loops, a weighting value of one of the colorants may be provided at a fixed value (e.g., black=0) while weighting values of another colorant (e.g., yellow=0-1) are searched.

Each combination of weighting values for the available colorants is further analyzed. In one implementation, criteria 34 including additional constraints or preferences may be utilized to incorporate empirical knowledge of a user or for other reasons. Certain constraints may apply to searching operations of all received colorimetric values 36 or be tailored corresponding to individual ones of the colorimetric values 36.

Exemplary constraints utilized to determine colorant amounts in CMYKcm color space include one or more of the following:
- total colorant limitations (cyan+magenta+yellow+black) $c \leq a$ threshold;
- restrict use of a specific colorant (e.g., black for bright colorimetric values=0 if L>50);
- do not use a dark colorant before lights are used to maximum weighting values (e.g., cyan=0 if light_cyan<maximum);
- prefer to use a maximum amount of yellow before dark colors are used.

One or more of the above constraints may be implemented in the searching protocol (e.g., identified above using nested loops) or after combinations of specific weighting values are formed in an exemplary CMYKcm space. The same or other constraints may be used in other color spaces. Additional aspects permit tailoring of search operations for weights responsive to a specific colorimetric value being analyzed. One example includes for colorimetric values on a blue ramp, yellow is not desired and the yellow colorant may be set to equal zero.

As mentioned above, once a combination of weighting values for the available colorants is selected, one or more of the weighting values may be analyzed for violation of a constraint. If a violation occurs, the nested loops above may be accessed to provide another combination of weighting values. The size of increments of the weighting values implemented during the search procedure-may be varied or modified by the user, but in one aspect an increment of 1/256 is utilized.

If no violation occurs for a given combination of weighting values, the $R(\lambda)$ value may be calculated using the obtained spectral model for the device including the calculated parameters. A CIE L*a*b* value may be obtained from the determined $R(\lambda)$ value utilizing the conversions previously described. Thereafter, the perceived error may be determined from the provided colorimetric value (e.g., CIE L*a*b* value) and the calculated CIE L*a*b* value resulting from the searched weighting values using the equations described above in one example.

Accordingly, perceived error values may be obtained for respective combinations of weighting values for the available colorants. One of the plurality of combinations of weighting values may be selected for utilization in a color map for a given colorimetric value 36. The selected weighting values may be referred to as weights which define amounts of respective colorants imaged upon reception of the respective colorimetric value 36 which was searched. In one embodiment, a combination of weighting values having the smallest associated perceived error may be selected as the weights. The selected weights may be stored in a look up table (LUT) file or other addressable format for utilization within image forming device 10. Alternatively, the weights may be utilized as a starting point and subsequent adjustments may be made (e.g., by a user) to "fine tune" the weights. Fine tuned weights may be stored in the look up table or other format for later usage in device 10 to associate received colorimetric values 36 with weights for controlling colorant amounts of available colorants. The look up table or other formatted data may be addressed using colorimetric values 36 during imaging operations.

Referring to FIGS. 4a and 4b, an exemplary methodology is illustrated for searching combinations of weights for a plurality of respective colorimetric values. The determined weights may be provided within a look up table or other appropriate addressable format for subsequent utilization within image forming device 10. The depicted methodology is exemplary and other methodologies are possible including more, less, or alternative steps. In one aspect, the illustrated methodology may be executed within computing device 38.

Referring to a step S10, a colorimetric value is accessed for which a combination of weights are to be determined.

At a step S12, information related to the respective colorimetric value may be accessed. For example, a user may input criteria regarding the respective colorimetric value to assist with the searching for the respective weights (e.g., yellow=0).

At a step S14, appropriate criteria for conducting a search for the respective weights is accessed. The criteria may minimize searching of weights known to provide acceptable results.

At a step S16, all weighting values for the colorants are set to equal zero except for white which is equal to 1.

At step S18, the weighting values of the respective colorant combination are analyzed with respect to the pertinent criteria of step S12 and step S14.

At a step S20, it is determined whether the obtained colorant combination meets the criteria.

If the condition of step S20 is negative, one or more of the weighting values are incremented at a step S22 and the method loops to step S18.

If the condition of step, S20 is affirmative, the second spectral model is accessed and a spectral distribution is calculated at a step S24 using the accessed spectral model of the image forming device and the weighting values of the respective colorant combination being analyzed.

At a step S26, the spectral distribution may be converted to the color space of the colorimetric value provided in step S10. Perceived error may be thereafter calculated for the respective combination of weighting values.

At a step S28, calculated perceived error of step S26 is compared with previously stored perceived error calculations (if any). At step S28 it may be determined whether the respective calculated perceived error is the lowest.

If the condition of step S28 is negative, the method loops to step S22.

If the condition of step S28 is affirmative, the weighting values of the colorant combination are saved as weights at a step S30.

At a step S32, it is determined whether the last combination of weighting values has been analyzed.

If the condition of step S32 is negative, the method loops to step S22.

If the condition of step S32 is affirmative, the weights may be written to a LUT at step S34.

At least some of the aspects of the invention may be implemented using appropriate processing circuitry configured to execute processor-usable or executable code stored within appropriate storage devices or communicated via a network or using other transmission media. For example, processor-usable code may be provided via articles of manufacture, such as an appropriate processor-usable medium comprising, for example, a floppy disk, hard disk, zip disk, optical disk, etc., or alternatively embodied within a transmission medium, such as a carrier wave, and communicated via a network, such as the Internet or a private network or other structure.

The protection sought is not to be limited to the disclosed embodiments, which are given by way of example only, but instead is to be limited only by the scope of the appended claims.

What is claimed is:

1. A color mapping method comprising:
   providing a first spectral modal including a plurality of variables;
   providing a second spectral model corresponding to a respective image forming device configured to utilize a plurality of available colorants to form a plurality of hard images, wherein the providing the second spectral model includes identifying a plurality of values for at least some respective ones of the variables of the first spectral model;
   providing a plurality of colorimetric values of a color space; and
   associating individual ones of the colorimetric values with a plurality of weights of respective ones of the available colorants using the second spectral model including the identified values.

2. The method of claim 1 wherein the associating comprises:
   searching a plurality of weighting values for respective ones of the available colorants; and
   selecting the weights from the weighting values responsive to the searching.

3. The method of claim 2 further comprising providing criteria regarding utilization of the available colorants by the image forming device to form the hard images, and the searching comprises searching using the criteria.

4. The method of claim 3 wherein the providing criteria comprises providing criteria which restricts usage of at least one of the available colorants.

5. The method of claim 3 wherein the providing criteria comprises providing criteria which restricts usage of at least one of the available colorants until usage of at least another one of the available colorants is maximized.

6. The method of claim 3 wherein the providing criteria comprises providing criteria which compares a sum of selected ones of the weighting values to a threshold.

7. The method of claim 3 wherein the providing criteria comprises providing criteria which specifies searching a plurality of the weighting values for at least one of the available colorants while providing one of the weighting velues of another of the available colorants at a fixed value.

8. The method of claim 2 wherein the searching comprises calculating perceived error for respective combinations of the weighting values with respect to the colorimetric values, and the selecting comprises selecting responsive to the calculating.

9. The method of claim 8 wherein the selecting comprises selecting the weights from the weighted values which minimize the perceived error.

10. The method of claim 1 wherein a number of available colorants of the image forming device is greater than a number of dimensions of the color space.

11. The method of claim 1 wherein the colorimetric values comprise CIE L*a*b* values and the image forming device is configured to form hard images using the available colorants of a CMYKcm device dependent color space.

12. The method of claim 1 wherein the associating comprises associating without imaging any of the available colorants after the providing the second spectral model.

13. The method of claim 1 further comprising storing the weights within a format which is addressable using the colorimetric values.

14. The method of claim 13 further comprising adjusting the weights after the associating and prior to the storing.

15. The method of claim 1 wherein the associating comprises associating the colorimetric values with the weights configured to control amounts of respective ones of the available colorants physically hard copy imaged upon physical media responsive to the colorimetric values.

16. The method of claim 1 wherein the providing the colorimetric values comprises providing input data to be processed to the second spectral model, and wherein the values of the variables comprise values independent of the colorimetric values.

17. The method of claim 1 wherein the providing the colorimetric values comprises providing input data to be processed to the second spectral model, and wherein the values of the variables are utilized to process the input data using the second spectral model.

18. The method of claim 1 further comprising printing a plurality of patches using the image forming device and wherein the identifying the plurality of values comprises identifying using the patches.

19. The method of claim 18 wherein the second spectral model comprises the first spectral model and the identified values of the variables of the first spectral model.

20. The method of claim 19 wherein the variables of the first spectral model are unknown, and the providing the second spectral model comprises solving for the variables of the first spectral model using the patches to identify the values.

21. The method of claim 19 wherein the first spectral model comprises a formula, and wherein the second spectral model comprises a formula which is the same as the formula of the first spectral model.

22. The method of claim 1 wherein the image forming device comprises a printer configured to print the hard images comprising hard copy color images upon physical media.

23. The method of claim 22 wherein the printer is configured to print the hard copy color images using a plurality of different colored marking agents corresponding to the available colorants.

24. The method of claim 23 wherein the different color marking agents comprise toner.

25. The method of claim 1 further comprising storing the weights in a format wherein the weights are addressable using colorimetric values.

26. The method of claim 1 wherein the first spectral model comprises a formula, and wherein the second spectral model comprises a formula which is the same as the formula of the first spectral model.

27. The method of claim 1 wherein the providing the colorimetric values comprises providing the colorimetric values comprising image data corresponding to content of at least one of the hard images to be formed, and wherein the weights are configured to control amounts of respective ones of the available colorants which are physically provided upon physical media to form the at least one of the hard images responsive to the colorimetric values.

28. The method of claim 27 wherein a number of the available colorants of the image forming device is greater than a number of dimensions of the color space.

29. The method of claim 1 wherein the providing comprises providing the colorimetric values comprising values of a device independent color space.

30. The method of claim 29 wherein the associating maps the colorimetric values from the device independent color space to a device dependent color space corresponding to the image forming device.

31. The method of claim 30 wherein the device dependent color space has more degrees of freedom than the device independent color space.

32. A color mapping apparatus comprising:
first means for accessing a first spectral model including a plurality of variables and for providing a second spectral model corresponding to a respective image forming device configured to utilize a plurality of available colorants to form a plurality of hard images, wherein the first means comprises means for identifying a plurality of values for at least some respective ones of the variables of the first spectral model to provide the second spectral model; and second means for associating individual ones of a plurality of colorimetric values of a color space with a plurality of weights of respective ones of the available colorants using the second spectral model including the identified values.

33. The apparatus of claim 32 wherein the second means comprises means for associating using criteria regarding utilization of the available colorants by the image forming device to form the hard images.

34. The apparatus of claim 32 wherein the second means comprises means for searching a plurality of weighting values for respective ones of the available colorants, and for selecting the weights from the weighting values responsive to the searching and which minimize perceived error.

35. The apparatus of claim 32 wherein the first means and the second means comprise common processing means.

36. The apparatus of claim 32 wherein the colorimetric values comprise colorimetric values of a device independent color space.

37. The apparatus of claim 32 wherein a number of the available colorants is greater than a number of dimensions of the color space.

* * * * *

UNITED STATES PATENT AND TRADEMARK OFFICE
CERTIFICATE OF CORRECTION

PATENT NO. : 7,342,593 B2
APPLICATION NO. : 10/286657
DATED : March 11, 2008
INVENTOR(S) : Ufuk A. Agar Page 1 of 1

It is certified that error appears in the above-identified patent and that said Letters Patent is hereby corrected as shown below:

In column 9, line 29; delete "c≤a threshold;" and insert -- ≤a threshold; --, therefor.

In column 11, line 25, in Claim 1, delete "modal" and insert -- model --, therefor.

In column 11, line 65, in Claim 7, delee "velues" and insert -- values --, therefor.

Signed and Sealed this

Twenty-sixth Day of August, 2008

JON W. DUDAS
*Director of the United States Patent and Trademark Office*